United States Patent
Krause

(10) Patent No.: US 8,981,672 B2
(45) Date of Patent: Mar. 17, 2015

(54) COLOR CONTROL OF DYNAMIC LIGHTING

(75) Inventor: Christian Krause, Aarhus C (DK)

(73) Assignee: VIP 1 ApS, Aarhus C (DK)

( * ) Notice: Subject to any disclaimer, the term of this patent is extended or adjusted under 35 U.S.C. 154(b) by 1785 days.

(21) Appl. No.: 11/991,950

(22) PCT Filed: Sep. 15, 2006

(86) PCT No.: PCT/DK2006/000511
§ 371 (c)(1),
(2), (4) Date: Sep. 30, 2010

(87) PCT Pub. No.: WO2007/033667
PCT Pub. Date: Mar. 29, 2007

(65) Prior Publication Data
US 2011/0187290 A1    Aug. 4, 2011

(30) Foreign Application Priority Data
Sep. 19, 2005    (DK) .................................. 2005 01300

(51) Int. Cl.
*G05F 1/00* (2006.01)
*H05B 37/02* (2006.01)
*H05B 33/08* (2006.01)

(52) U.S. Cl.
CPC ............ *H05B 37/02* (2013.01); *H05B 33/0863* (2013.01); *H05B 37/0254* (2013.01); *Y02B 20/341* (2013.01)
USPC ............ 315/307; 315/297; 315/308; 315/312

(58) Field of Classification Search
USPC .......................... 315/291, 297, 302, 307, 312
See application file for complete search history.

(56) References Cited

U.S. PATENT DOCUMENTS

| | | | |
|---|---|---|---|
| 7,012,382 B2 * | 3/2006 | Cheang et al. | ................. 315/291 |
| 2005/0062446 A1 | 3/2005 | Ashdown | |

(Continued)

FOREIGN PATENT DOCUMENTS

| | | |
|---|---|---|
| EP | 1 528 844 A2 | 5/2005 |
| EP | 1528844 | 5/2005 |

(Continued)

OTHER PUBLICATIONS

USPTO Office Action for U.S. Appl. No. 14/189,887, notification date Jul. 9, 2014.

(Continued)

*Primary Examiner* — Douglas W Owens
*Assistant Examiner* — Jianzi Chen
(74) *Attorney, Agent, or Firm* — Dunlap Codding, P.C.

(57) ABSTRACT

This invention relates to a method of adjusting the fixture color emitted by a first and a second lighting fixture to a target color, each lighting fixture comprising at least a first and a second light source emitting light having different source colors, and said fixture color is obtained as a combination of said source colors, and said fixture color can be varied by varying the intensity of each light source; where the adjusting of said fixture color to a target color is performed by varying the intensity of said light sources based on both a first color gamut and a second color gamut respectively described by said source colors from said first lighting fixture and said second lighting fixture. The invention further relates to a light adapter and light system for adjusting the fixture color emitted by a first and a second lighting fixture to a target color and to a computer-readable medium having stored therein instructions for causing a processing unit to execute said method.

16 Claims, 6 Drawing Sheets

(56) References Cited

U.S. PATENT DOCUMENTS

2005/0116667 A1  6/2005  Mueller et al.
2011/0187290 A1  8/2011  Krause

FOREIGN PATENT DOCUMENTS

WO      WO 01/36864        5/2001
WO      WO 01/36864 A2     5/2001
WO      WO 2007/033667     3/2007

OTHER PUBLICATIONS

USPTO Decision on Request to Participate in the Patent Prosecution Highway Program and Petition to Make Special Under 37 CRF 1.102(a) for U.S. Appl. No. 14/189,887 mailed May 20, 2014.
The International Search Report for PCT/Dk2006/000511 filed in EP193866, Mar. 29, 2007.
Priority document for International Application No. PCT/DK2006/000511 filed in EP193866, Apr. 18, 2007.
Reply to International Search Opinion for International Application No. PCT/DK2006/000511 filed in EP193866, Jul. 11, 2007.
Amended sheet description filed in EP193866, Jul. 11, 2007.
Amended sheet claims filed in EP193866, Jul. 11, 2007.
PCT demand form for PCT/DK2006/000511 filed in EP193866, Jul. 11, 2007.
Document concerning fees and payments for PCT/DK2006/000511 filed in EP193866, Jul. 11, 2007.
Abstract filed in EP193866, Jul. 11, 2007.
Notification of receipt of demand for PCT/DK2006/000511 filed in EP193866, Jul. 18, 2007.
Notification of documents sent to WIPO for PCT/DK2006/000511 filed in EP193866, Jul. 18, 2007.
Notification of defects in the demand for PCT/DK2006/000511 filed in EP193866, Aug. 8, 2007.
Notification of documents sent to WIPO for PCT/DK2006/000511 filed in EP193866, Aug. 14, 2007.
Invitation to correct defects in demand for PCT/DK2006/000511 filed in EP193866, Aug. 14, 2007.
Notification of election of EPO for PCT/DK2006/000511 filed in EP193866, Aug. 21, 2007.
Fax filed during the PCT2 procedure for PCT/DK2006/000511 filed in EP193866, Sep. 3, 2007.
Notification of documents sent to WIPO for PCT/DK2006/000511 filed in EP193866, Sep. 7, 2007.
Transmittal of International Preliminary Examination Report for PCT/DK2006/000511 filed in EP193866, Nov. 22, 2007.
Notification of documents sent to WIPO for PCT/DK2006/000511 filed in EP193866, Nov. 22, 2007.
International Preliminary examination report for PCT/DK2006/000511 filed in EP193866, Nov. 22, 2007.
Information on entry into European phase for PCT/DK2006/000511 filed in EP193866, Feb. 1, 2008.
Letter which had not been notified for PCT/DK2006/000511 filed in EP193866, Feb. 11, 2008.
The International Preliminary examination report for PCT/DK2006/000511 filed in EP193866, Apr. 2, 2008.
Annexes to the international preliminary examination report for PCT/DK2006/000511 filed in EP193866, Apr. 2, 2008.
Request for entry into the European phase for PCT/DK2006/000511 filed in EP193866, Apr. 5, 2008.
Communication regarding possible amendment of payment of claims for EP193866, May 2, 2008.
Notification on forthcoming publication of bibliographic data for EP193866, Jun. 4, 2008.
Letter concerning fees and payments for EP193866, Aug. 28, 2008.
Request for change of applicant's representative EP193866, May 20, 2009.
Notification of termination of representative's authorization for EP193866, Jun. 19, 2009.
Letter concerning fees and payments for EP193866, Aug. 3, 2009.
Communication for the Examining Division for EP193866, Nov. 9, 2009.
Reply to communication from the Examining Division for EP193866, Mar. 5, 2010.
Communication concerning signing of documents for EP193866, Mar. 16, 2010.
Reply to the invitation to remedy deficiencies for EP193866, Apr. 26, 2010.
Reply to communication from the Examining Division for EP193866, Apr. 26, 2010.
Letter concerning fees and payments for EP193866, Sep. 6, 2010.
Letter concerning fees and payments for EP193866, Sep. 8, 2011.
Text intended for grant for EP193866, Jan. 24, 2010.
Intention to grant (signatures) for EP193866, Jan. 24, 2012.
Communication about intention to grant a European patent for EP193866, Jan. 24, 2012.
Bibliographic data of the European patent application for EP193866, Jan. 24, 2012.
Letter concerning fees and payments for EP193866, Mar. 16, 2014.
German translation of the claims for EP193866, Mar. 20, 2012.
Brief communication to applicant/representative for EP193866, Mar. 29, 2012.
Annex to a communication for EP193866, Mar. 29, 2012.
French translation of claims for EP193866, Apr. 13, 2012.
Filing of the translations of the claims for EP193866, Apr. 13, 2012.
Decision to grant a European patent for EP193866, May 7, 2012.
Communication regarding the expiry of opposition period for EP193866, Apr. 4, 2013.

* cited by examiner

COLOR CONTROL OF DYNAMIC LIGHTING

FIELD OF THE INVENTION

The present invention relates to systems and methods of controlling dynamic lighting.

Dynamic lighting fixtures capable of changing color are becoming more and more popular and are used in many different environments such as theatres, discotheques, exhibitions, shops, private homes, etc. Dynamic lighting fixtures can be constructed in a number of different ways, for instance by using a light source emitting light having a broad spectral distributing, which would appear as white light when seen by a person. Different optical filters could then be inserted in front of the light source, e.g. by mechanical means, such that a part of the spectral distribution would be attenuated causing a person to see another color.

Another dynamic lighting fixture capable of changing color comprises at least two light sources emitting light with different spectral distributions such that a person would seen the light as two different colors. The light from the light sources is combined in the lighting fixture resulting in an added spectral distribution which is emitted from the lighting fixture, and a person would see the combined light as a third color. A dynamic lighting fixture is capable of varying the intensity of each light source such that the added spectral distribution would vary when the intensity of the light sources is varied. The consequence is that a multiple number of added spectral distributions could be created causing a person to see a multiple number of different colors. In other words, the color emitted by the dynamic lighting fixture could be altered by varying the intensity of the light sources. This could be illustrated by plotting the color of the light sources on a color map, e.g. the CIE 1931 color space, such that each light source would be represented by a point on the color map. The line connecting the two points would represent the colors that can be made by varying the intensity of the two light sources. Most dynamic lighting fixture comprises three or more light sources and an area could be constructed on a color map when the color of the light sources is plotted on the color map. The area would then represent the colors that could be made by varying the intensity of the light sources.

More and more dynamic lighting fixtures are being introduced, and especially dynamic lighting fixtures based on LED's technology are widely used. Furthermore, a large number of vendors producing dynamic lighting fixtures exists, and the consumer therefore has the possibility of choosing between a large number of different dynamic lighting fixtures. Many consumers want to use a multiple number of dynamic fixture systems and combine systems from different vendors in order to create a certain illumination. This is a very complex procedure due to a high number of different light sources, different color parameters and different color mixing systems. Typically the consumer needs to construct a very complex system in order to combine/integrate a multiple number of dynamic lighting systems. This is a very time consuming process because it requires measuring of the spectral distribution of each light source, complex programming and detailed knowledge of system specifications of each dynamic lighting system in order to make sure that each dynamic system would be correctly controlled. One problem when combining different dynamic lighting fixtures is to ensure that the chosen color would appear identical on the different dynamic lighting fixtures.

WO01/36864 A2 describes a lighting system for generation and modulation of natural light such that the black body radiation spectrum can be simulated at different white color temperatures. The system could therefore simulate early morning daylight with a white color temperature around 3000 K and/or overcast midday daylight with a white color temperature around 10000 K. The system comprises a number of light sources having different spectral characteristics, and the system is capable of combining the light sources such that a predetermined spectral characteristic is achieved. Further, WO01/36864 A2 describes that the lighting system could be used as a dynamic lighting system able to generate different colors by varying the intensity of the light sources. This is achieved by storing the spectra of each light source and thus use the spectra to calculate the resulting color when the intensity of the light sources are varied. Thereby it could be calculated how the intensity of the different light sources should be varied in order to generate a certain color. This system requires knowledge of the spectral distribution of the light sources in order to be able to perform the calculations. This requires that these spectral distributions are measured, particularly because many lighting fixture vendors do not specify the spectral distributions of the light sources. This is a very time consuming process, especially when a consumer wants to combine different dynamic lighting fixtures. Further, complicated and expensive measurement systems such as spectrometers or monochronometers are required in order to obtain the spectra. The data handling and controlling of the dynamic lighting systems also become very time consuming and complex since the spectra comprise large amounts of data which must be processed.

US2005/0062446, discloses an illumination system comprising a plurality of light-emitting elements which create illumination at a number of different wavelengths, wherein the color that can be produced by the illumination system is defined by the color gamut defined by the colors of each light-emitter. The color produced by the illumination system is adjusted by varying the intensity of the individual light-emitters, and the system further comprises a detector detecting properties of the produced color and the produced color can be adjusted according to the detected properties. The data handling and controlling of the illumination systems is time consuming and complex since the properties of the produced light need to be detected and processed.

OBJECT AND SUMMARY OF THE INVENTION

The object of the invention is to solve the problems described above.

A method of adjusting the fixture color emitted by a first and a second lighting fixture to a target color, each lighting fixture comprising at least a first and a second light source emitting light having different source colors and said fixture color is obtained as a combination of said source colors, and said fixture color can be varied by varying the intensity of each light source, where the adjustment of said fixture color to a target color is performed by varying the intensity of said light sources based on both a first color gamut and a second color gamut respectively described by said source colors from said first lighting fixture and said second lighting fixture. Hereby is achieved that the fixture color of a multiple number of lighting fixtures could be adjusted to a target color according to color gamut of the individual color systems in each lighting fixture. The target color can therefore be selected independently of the color systems used in the lighting fixtures, and the fixture color of each lighting fixture could be adjusted to the target color according to color gamut of the individual color systems. The color gamut defines fixture colors which the individual fixtures could emit and could be illustrated by an area or a line in a color map such as CIE 1931/1964 xy color diagrams, RGB-, CMY-, YUV-, CIELAB-, CIELUV-color spaces, etc.

In another embodiment the method comprises the step of obtaining color parameters describing the color of said first and second source colors of said first and second lighting fixtures as a source position on a color map and generating said color gamut using said color parameters. Hereby a simple and fast method of adjusting the fixture color of lighting fixtures is provided. The color parameter describes the position of the source colors of each lighting fixtures in a color, etc. The color parameters could for instance be described by (x,y,z) coordinates, (hue, saturation) parameters or any other parameter capable of defining a position in a color map. The color gamut could by defined from the color parameter. The color parameters could be obtained, for instance, by entering the color parameters manually or automatically when the lighting fixtures are connected e.g. through a network. The method makes it possible to connect a multiple number of lighting fixtures and to easily adjust the fixture color of each lighting fixture to a target color since the fixture color of each lighting fixture could be adjusted to the target color by using the color parameters and color gamut of the individual lighting fixtures.

In one another embodiment the method further comprises the step of choosing said target color as a position on said color map. Hereby a simple user interface could be constructed allowing a user to choose the target color as a position on a color map independent of the color systems of the lighting fixture, and the fixture color of each lighting fixture could still be adjusted to the target color. In other words, a user could choose a target color as a position on a color map, and this position would thereafter be converted into the individual color gamut of each lighting fixture. The position of the target color in a color map such as CIE 1931/1964 xy color diagrams, RGB-, CMY-, YUV-, CIELAB-, CIELUV-color spaces, etc. could for instance be described by (x, y, z) coordinates, (hue, saturation) parameters or other parameters capable of defining a position in a color map.

In another embodiment of the method said adjusting of said fixture color to a target color by varying the intensity of said light sources is based on a common color gamut generated by combining said first and second color gamut. Hereby it is achieved that a common color gamut could be generated. The common color gamut could define the colors which can be generated by at least one of the lighting fixtures, define the colors that could be generated by all lighting fixtures or define color that could be generated by a group of lighting fixtures. Further, it is achieved that the target color could be adjusted according to the colors which can be generated by at least one of the lighting fixtures, the colors that could be generated by all lighting fixtures and/or the colors that could be generated by a group of lighting fixtures.

In one another embodiment of the method said step of adjusting the fixture color comprises the step of adjusting said target color such that the position of said target color in said color map would be a part of said common color gamut. Hereby the target color could be adjusted according to a common color gamut such that it is avoided that the target color extends the color gamut of the lighting fixtures and can therefore not be generated by the lighting fixtures. Thereby overflow due to target colors extending the color gamut of the lighting fixtures could be avoided. The target color could for instance be adjusted such that it would not extend a color gamut; this e.g. by scaling, clipping or transforming the target color according to predefined rules.

In one another embodiment of the method said color parameters further comprise the intensity rang of said light sources. Hereby the intensity rang of each light source could be used when adjusting the fixture color of the lighting fixtures to the target color.

In one another embodiment of the method said color map is a CIE color map. Hereby a user interface including all visible colors to a person could be constructed, and the user could choose the target color as a color in the CIE color map; hereafter the fixture color of each lighting fixture could be adjusted to the target color according to color parameters, color gamuts and/or common color gamuts.

In another aspect the present invention relates to a light adapter for adjusting the fixture color emitted by a first and a second lighting fixture to a target color, each lighting fixture comprising at least a first and a second light source emitting light having different source colors, and said fixture color is obtained as a combination of said source colors and said fixture color which can be varied by varying the intensity of each light source, where said light adapter comprises means for adjusting said fixture color to a target color by varying the intensity of said light sources based on both a first color gamut and a second color gamut respectively described by the source colors from said first lighting fixture and said second lighting fixture. Hereby a light adapter for adjusting the fixture color emitted by a number of lighting fixtures to a target color is provided. The lighting adapter is making it possible to connect a multiple number of lighting fixtures to the light adapter and use the light adapter to adjust the fixture color such that the lighting fixtures would emit the target color. Hereby the same advantages as described above are achieved.

In another embodiment the light adapter comprises means for obtaining color parameters describing the color of said first and second source colors of said first and second lighting fixtures as a source position on a color map and means for generating said color gamut using said color parameters. Hereby the same advantages as described above are achieved.

In another embodiment the light adapter further comprises means for choosing said target color as a position on said color map.

In another embodiment of the light adapter said means for adjusting said fixture color to a target color is performed by varying the intensity of said light sources based on a common color gamut, and in that said light adapter comprises means for generating said common color gamut by combining said first and second color gamut. Hereby the same advantages as described above are achieved.

In another embodiment of the light adapter said means for adjusting said fixture color comprise means for adjusting said target color such that the position of said target color in said color map would be a part of said common color gamut. Hereby the same advantages as described above are achieved.

In another embodiment of the light adapter said color parameters further comprise the intensity rang of said light sources. Hereby the same advantages as described above are achieved.

In another embodiment of the light adapter said color map is a CIE color map. Hereby the same advantages as described above are achieved.

The present invention further relates to a lighting system comprising a number of lighting fixtures where said lighting fixtures comprise at least two light sources each emitting a source color, and where said dynamic lighting fixtures are adapted to combine said source colors and thereby generate a fixture color, and the color of said fixture color can be varied by varying the intensity of said source colors where said lighting system further comprises a light adapter as described above, and where said light adapter is adapted to adjust said fixture color emitted by a number of lighting fixtures to a target color. Hereby a lighting system comprising a number of lighting fixtures and the light adapter as described above is achieved with the same advantages as described above.

In another embodiment of the lighting system said number of lighting fixtures and said light adapter are connected to a network. Hereby the light adapter could obtain the color parameters through the network, and the fixture color of each lighting fixture could be adjusted by the light adapter through the network.

In another embodiment of the lighting system said means for obtaining said color parameters comprised by said light adapter are adapted to obtain said color parameters through said network. Hereby the light adapter could be adapted to automatically obtain the color parameters of each lighting fixture through the network, for instance by sending the color parameters as data through the network. A lighting system could therefore easily be constructed/assembled by a user without the user having to worry about complex programming and how to control each lighting fixture.

In another embodiment of the lighting system said means for adjusting said fixture color of said lighting fixtures comprised by said light fixture are adapted to adjust said fixture color through said network. Hereby a lighting system could easily be contrasted by a user without the user having to worry about controlling the individual lighting fixtures.

The present invention also relates to a computer-readable medium having stored therein instructions for causing a processing unit to execute the above described. Hereby it is achieved that the above described method could be implemented in a processing unit which could be integrated in a light adapter. Hereby the above described advantages are achieved.

BRIEF DESCRIPTION OF THE DRAWINGS

In the following, preferred embodiments of the invention will be described referring to the figures, where.

DESCRIPTION OF EMBODIMENTS

Figure 1:
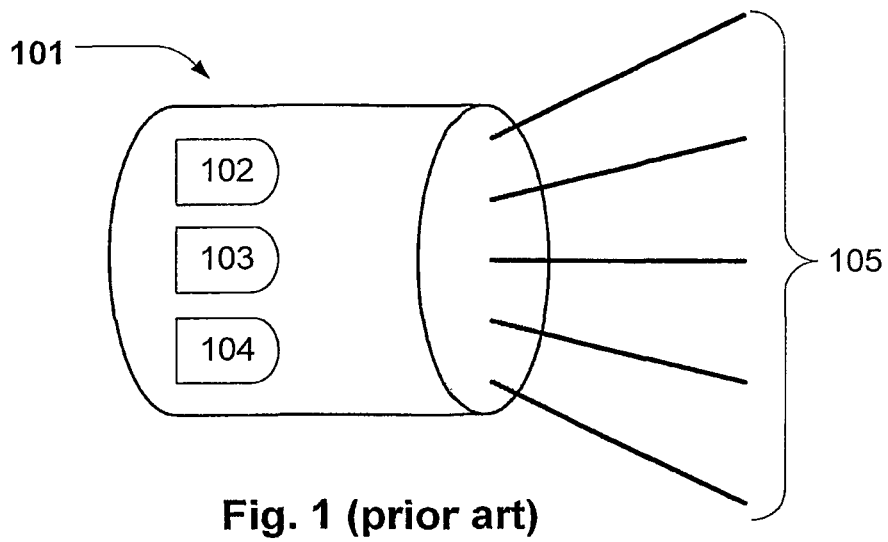
FIG. 1 illustrates a dynamic lighting fixture

FIG. 1 illustrates a dynamic lighting fixture (101) comprising three light sources: a red emitter (102), a green emitter (103) and a blue emitter (104). The light emitted by the three light sources is combined within fixture such that combined/added light (105) is emitted from the fixture. This fixture uses three parameters for controlling the red, green and blue emitter and each parameter is used to set the brightness within 0 to a 100% of each emitter thus making an additive color mixing system. Controlling these three parameters individually between 0 to a 100% enables the emission of different colors within the color gamut of the three emitters. The color gamut is defined by the area on a color map which could be constructed by plotting the color of the three light sources on the color map.

The shown fixture uses red, green and blue emitters and is thus known as a RGB fixture; however, some fixtures use cyan, magenta and yellow emitters (CMY fixtures). Other dynamic lighting fixtures capable of additive color mixing are based on a four parameter color system based on red, green, blue and white emitters. The white emitter is added to create a higher color rendering performance at white colors. Thus, any number of emitters larger than two could be used in the additive color mixing; a dynamic lighting fixture could for instance comprise six emitters such as cyan, magenta, yellow, red, green and blue emitters.

Figure 2:
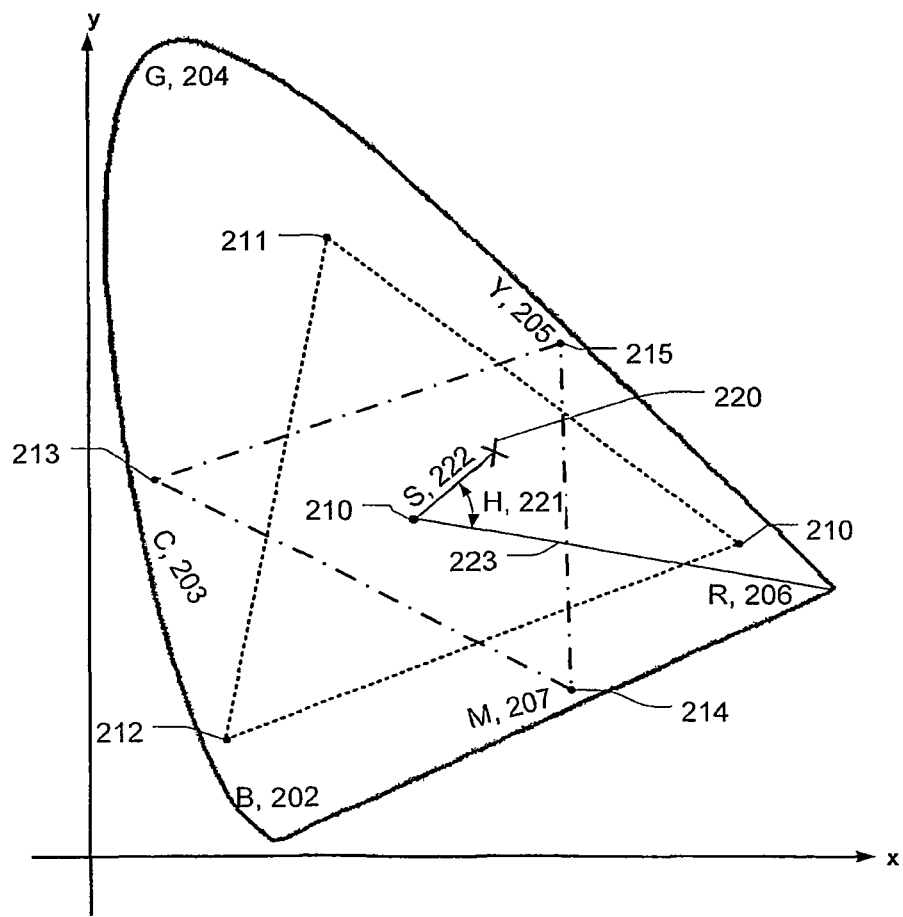
FIG. 2 illustrates the CIE 1931 Chromaticity xy color diagram

Each fixture color mixing system has advantages and disadvantages. The colors achievable by a fixture are also called the fixtures gamut, which is seen as an area within a color map such as a CIE 1931 color diagram, and the area is defined by two or more color coordinate points; one for each emitter in the addictive color mixing system. FIG. 2 illustrates typical gamuts of a RGB fixture and a CMY fixture.

FIG. 2 illustrates the CIE 1931 Chromaticity xy color diagram where the "center" (201) of the color diagram corresponds to the color white, and the outer curved portion corresponds to colors seen by a person with blue (202), cyan (203), green (204), yellow (205), red (206) and magenta (207) indicated on the color diagram. The gamut of a RGB fixture is illustrated by a dotted triangle where the color of the red (210), green (211) and blue (212) light sources comprises the corners of the triangle. Further, gamut of a CMY fixture is illustrated by a dashed and dotted triangle with the corners comprising the color of the cyan (213), magenta (214) and yellow (215) light sources. It can be seen that the RGB fixture can make some colors which the CMY fixture cannot make, and vice versa. The common area of the two triangles illustrates the colors which are achievable by both fixtures.

A color (220) could be defined by the two parameters hue (221) and saturation (222). Hue defines the color as the angle between the line (223) from the white color to the red color at the outer curve. Saturation defines the saturation of the color as the distance from the center to the color along the angled line. This means that colors with 100% saturation are placed on the outer curve, and colors with low saturation are placed near the center of the color diagram. This Hue/Saturation format defines all colors visible to the human eye.

Figure 3:
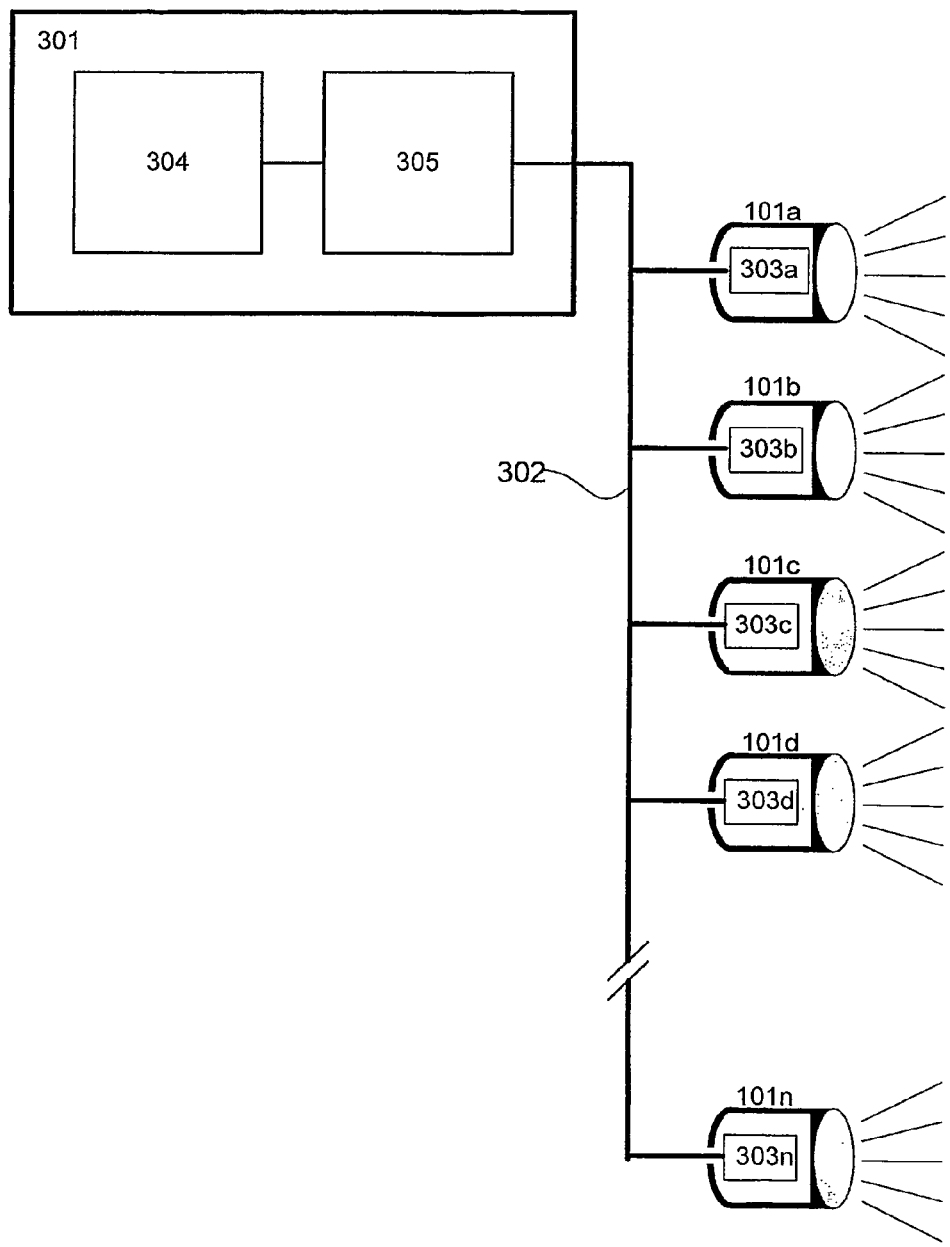
FIG. 3 illustrates an embodiment of the present invention

FIG. 3 illustrates an embodiment of the present invention and illustrates a controller (301) and a number of dynamic lighting fixtures (101a, 101b, 101c, 101d, 101n) that are connected in data network (302). The fixtures could be any kind of fixtures as described in FIG. 1 and produced by different vendors. Each fixture has its own unique network ID enabling the controller to identify, set and retrieve data individually from each fixture connected to the network. The type of network could be any type of network standard allowing two-way communication between the controller (301) and the fixtures (101a, 101b, 101c, 101d, 101n). Each fixture comprises a network driver (303a, 303b, 303c, 303d, 303n) adapted to handle data from the controller (301) on the network (302) and set the fixtures parameters accordingly. The network drivers could be realized by using a microcontroller, programmable logic or the like.

In this embodiment the controller (301) comprises two units, i.e. a show controller (304) and a color controller (305). The show controller unit is capable of controlling multiple fixtures and changing their color parameters over time with respect to a user pre-programmed pattern. This could also include video playback systems where each fixture is defined as one or more pixels. The show controller could further comprise a user interface allowing a user to adjust the colors of the fixtures and make color shows.

The color controller unit (305) is adapted to create a standardized interface for the show controller unit (304) for transferring show color information to each fixture. This means that all fixtures on the data network are represented to the show controller unit (304) via the color controller unit (305) as all having identical types of color control parameters even if the fixtures are different kinds of fixtures due to different color mixing systems as previously described in FIG. 1 or produced by different vendors.

The controller (301) could be realized by using a microcontroller, programmable logic or the like. The show controller unit (304) and the color controller unit (305) could be realized in one or in two separate hardware processing units, if desired.

The color controller unit (305) acts as a color space converter, converting from one color space into the color spaces required for each fixture on the network. The consequence is that a user could choose a color using the show controller, for instance, by choosing the hue and saturation of an input color. The color controller would thereafter convert the input color into the color spaces used by each fixture. The color space conversion is in this to embodiment being processed centrally by the color controller unit (305), however, it could also be processed decentralized within each fixtures network driver (303*a*, 303*b*, 303*c*, 303*d*, 303*n*).

The input colors delivered to the color controller unit (305) consist of a pre-defined color space that applies to all fixtures. The color space used in the embodiment has been created using the CIE 1931 Chromaticity xy color diagram as described in FIG. 2, where two parameters are used to define a color; namely hue and saturation. The hue/saturation format defines all colors visible to the human eye and there is thus no limit to which colors can be defined by the show controller unit (304), but any other color space could be used if desired, such as RGB, CMY, YUV, CIELAB, CIELUV, CIE 1964 xy color diagram, etc.

An important function of the color controller unit (305) is to take the gamut of the fixtures into account before converting to the color spaces of each fixture. The color controller unit (305) therefore needs to have gamut information of each fixture connected to the data network (305). As illustrated in FIG. 2, the color controller only needs the positions of the light sources in the color space in order to create the color gamut of the fixture. Each piece of fixture gamut information is stored in the fixtures network driver (303) along with other color parameters used for color space conversion based on a previously made color measurement made for each fixture. The color controller unit (305) therefore first retrieves these data from each fixture on the data network (302) before starting any color control processes.

When the color controller unit (305) has retrieved the color coordinates and generated color gamuts from each fixture the gamuts are super imposed to define a global inner and outer gamut.

Figure 4:
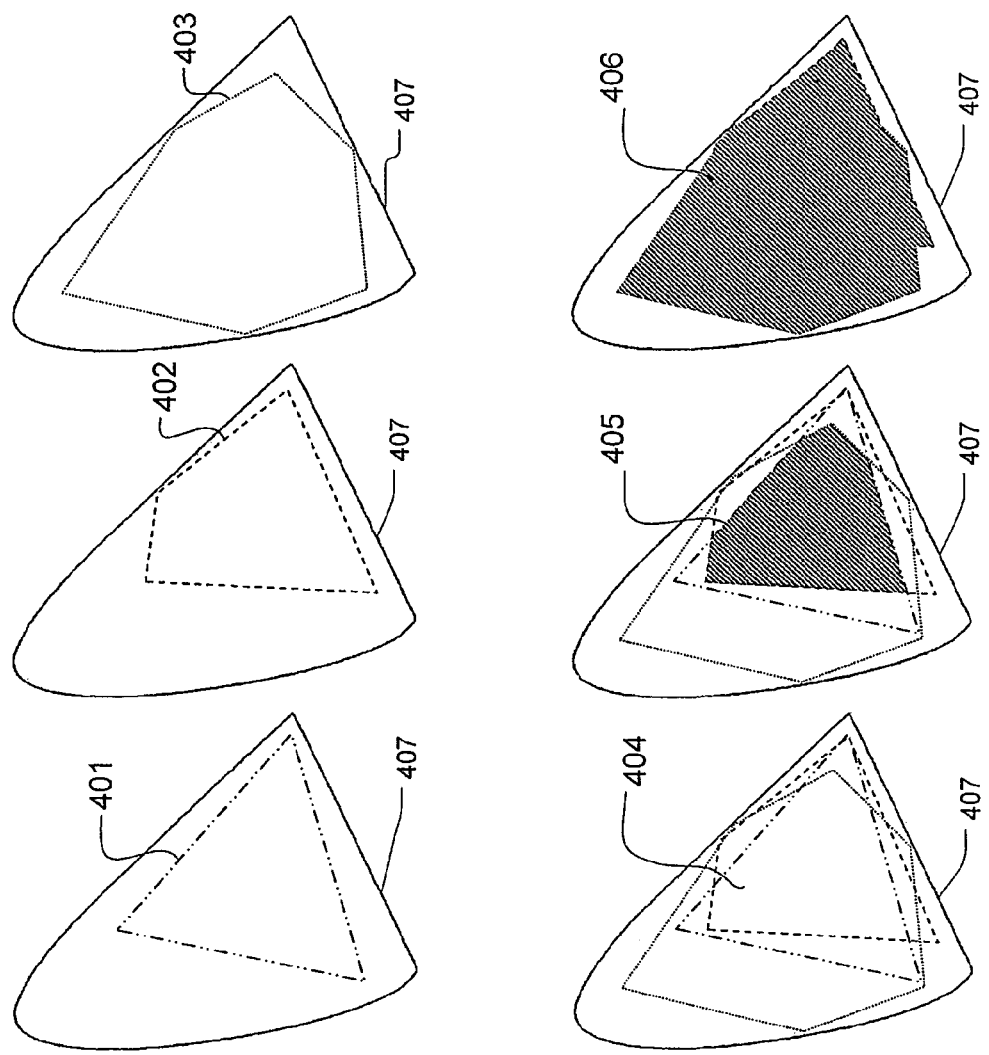
FIG. 4 illustrates the process of generating a global inner and outer gamut for a network comprising three different dynamic lighting fixtures

FIG. 4 illustrates the process of generating a global inner and outer gamut for a network comprising three different dynamic lighting fixtures. The figure illustrates the gamut (401), (402) and (403) of the three different dynamic lighting fixtures in CIE 1931 color diagrams (407). First the gamuts are super imposed (404) so that a global inner gamut is defined (405) and a global outer gamut is defined (406). The global inner gamut (405) contains colors that all fixtures on the data network can process simultaneously, and the global outer gamut (406) contains maximal colors that can be processed non-simultaneously. Both global inner (405) and outer (406) gamuts are desirable as in some cases the full color gamuts are needed to achieve colors on some fixtures that are outside the global inner gamut (405) without having the limitations of other fixtures' lower gamut. Besides the global inner (405) and outer (406) gamut other gamuts can be defined if desired.

The color controller unit (305) uses the individual fixture gamut (401, 402, 403) information to ensure that no fixture will be set to an unachievable color resulting in an overflow or underflow of the individual fixtures parameters after color space conversion. The global gamuts (405, 406) are used in respect to how the input color from the show controller unit (304) is being processed by the color controller unit (305). The color controller can process the input color using the global gamuts in two different ways as illustrated in FIG. 5.

Figure 5:
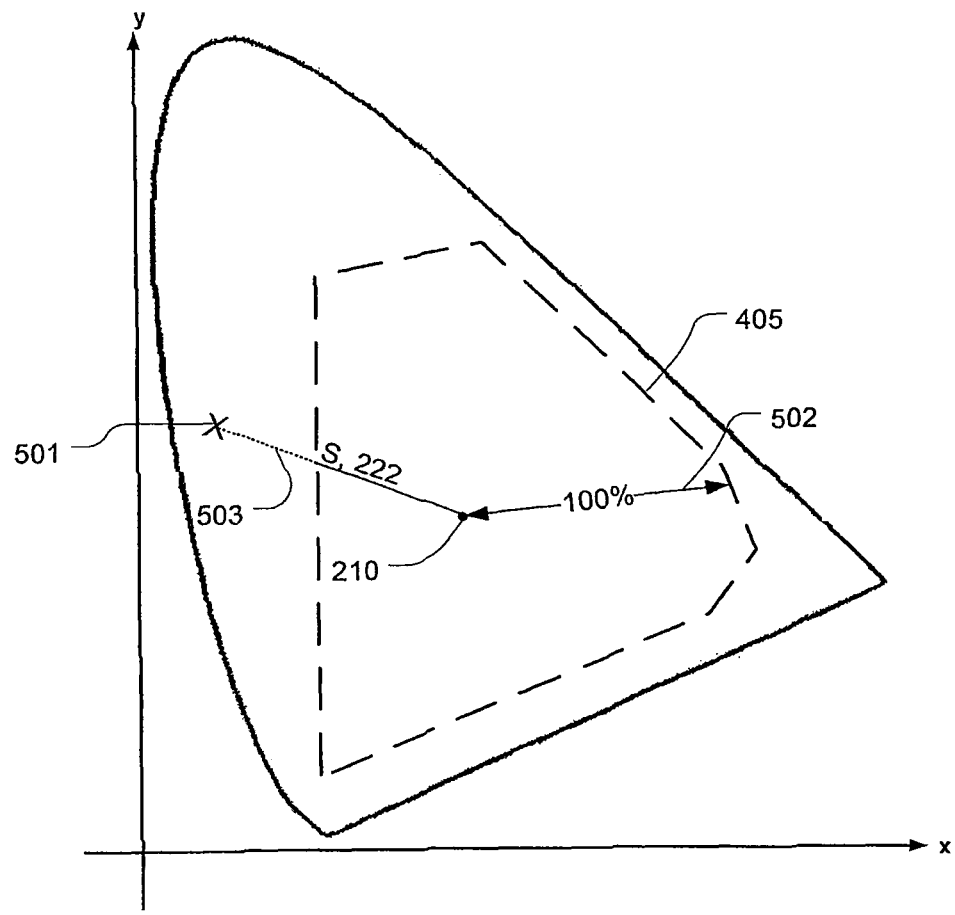
FIG. 5 illustrates on a CIE 1931 color diagram how the Color Controller could process an input color

FIG. 5 illustrates on a CIE 1931 color diagram how the Color Controller could process an input color (501) which saturation value exceeds global gamut (405). The exceeding part of the saturation value would then be clipped as illustrated by a dotted line (503) by the color controller, and clipped saturation would then be processed onto the fixtures. At the same time a warning could be sent back to show controller unit warning of out of gamut error. The saturation parameter could therefore be scaled according to the global gamut such that the global gamut would be scaled to a 100% saturation as illustrated by arrow (502).

Other global gamuts can be defined by color controller unit if desired, and specific gamuts can be set for different fixture groups if desired. Note that the gamut control function could as well be processed decentralized within each fixtures network driver if desired, or pre-installed in a memory storage.

The overall advantages of the color controller unit gamut control is that the show controller unit would never have to be concerned with which types of fixtures are used and how to make them match desired colors. This makes it simple for the user to connect any number of fixtures to the data network and immediately have them working together easy and fast. This becomes even more important when the show controller unit is programmed by the user as she/he would not manually have to include color matching in the show, thus making it much faster to program shows and which makes the shows portable between other fixtures and locations.

Figure 6:
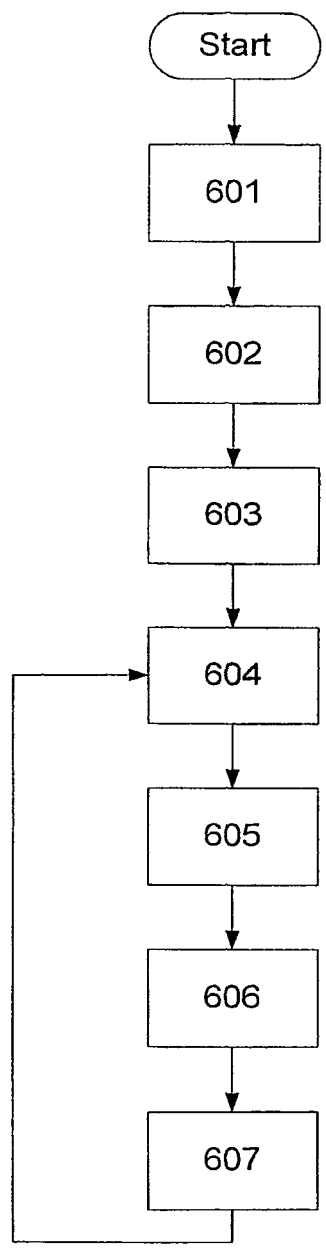
FIG. 6 illustrates how a flow diagram of the color controller unit could process input colors

FIG. 6 illustrates how a flow diagram of the color controller unit could process input colors, gamuts, the dynamic lighting fixtures, etc.

In 601 the color controller receives and saves fixture color space information from each fixture connected to the data network. The fixture color space information could be the position of the color of each fixture's light sources on a color map, for instance described by (Hue, Saturation) parameters or the (x,y) coordinates in a CIE 1931 color diagram. The color parameters could also have been stored in a memory storage and be recalled from the memory storage.

In 602 the color controller processes individual gamuts for each fixture based on the in (601) received and saved fixture color space information and saves the individual gamuts.

In 603 the color controller generates global gamuts based on the individual gamuts saved in 602 and saves the global gamut. The global gamuts could be the global inner and outer gamuts described in FIG. 4.

In 604 the color controller receives input color parameters, for instance (hue, saturation) values from the show controller unit. The input color parameters could be common for all fixtures meaning that all fixtures should emit the same color, or the input color parameters could be addressed to certain fixtures.

In 605 the color controller adjusts the in 604 received color parameters such that the input color parameters are within the boundaries of a pre-selected global gamut generate in step 603.

In 606 the color controller converts the individual color parameters into the individual color spaces of each fixture based on the in 601 saved fixture color space information such that each fixture could be adjusted to the input color.

In 607 the color controller transmits the individual converted color spaces to the respective fixtures on the data network such that each fixture would emit a color according to the input color Step 604 to step 606 is repeated as long as color input information is available at show controller, creating continuous streams of color information to fixtures and thereby creating a dynamic color change over time if desired.

The color conversion process described in step 606 can be done by using standard color space conversion algorithms known in the art.

As an example, the algorithms for a RGB color mixing system is shown. xr, yr is the color point coordinates and Ir the intensity for the red light source; xg, yg is the color point coordinates and Ig the intensity for the green light source, and xb, yb is the color point coordinates and Ib the intensity for the blue light source. InputX and inputY are the desired CIE color point coordinates of the target color, and I is the desired intensity of the target color.

The intensity R, G, B to which the red, green and blue emitter should be adjusted to respectively could then be found by solving the matrix equation below.

$$\begin{bmatrix} R \\ G \\ B \end{bmatrix} = \begin{bmatrix} xrCr & xgCg & xbCb \\ yrCr & ygCg & ybCb \\ zrCr & zgCg & zbCb \end{bmatrix}^{-1} \begin{bmatrix} X \\ I \\ Z \end{bmatrix}$$

where:

$$zr = 1 - xr - yr$$

$$zg = 1 - xg - yg$$

$$zb = 1 - xb - yb$$

$$Cr = Ig/yg$$

$$Cg = Ig/yg$$

$$Cb = Ib/yb$$

$$X = (inputX/inputY) * I$$

$$Z = ((1 - inputX - inputY)/inputY) * I$$

The same principle can be used for color systems using more than three color sources by adding more factors to the matrix; this will of course result in more input parameters. For instance, in a RGBW (red, green, blue, white) color mixing system consisting of four color sources will a forth parameter be needed which could be the intensity of the white centre source. The white intensity value could then depend on one or more of the following scenarios:

1. Maximum possible intensity (not all colors can then have the same intensity)
2. Constant intensity (the maximum intensity is then set at the values of the intensity of the lowest emitter)
3. Maximum Color Rendering (the values are then controller based on color measurements to give the best color rendering at white colors).

Choosing how the parameters should be controlled depends on the application.

Figure 7:
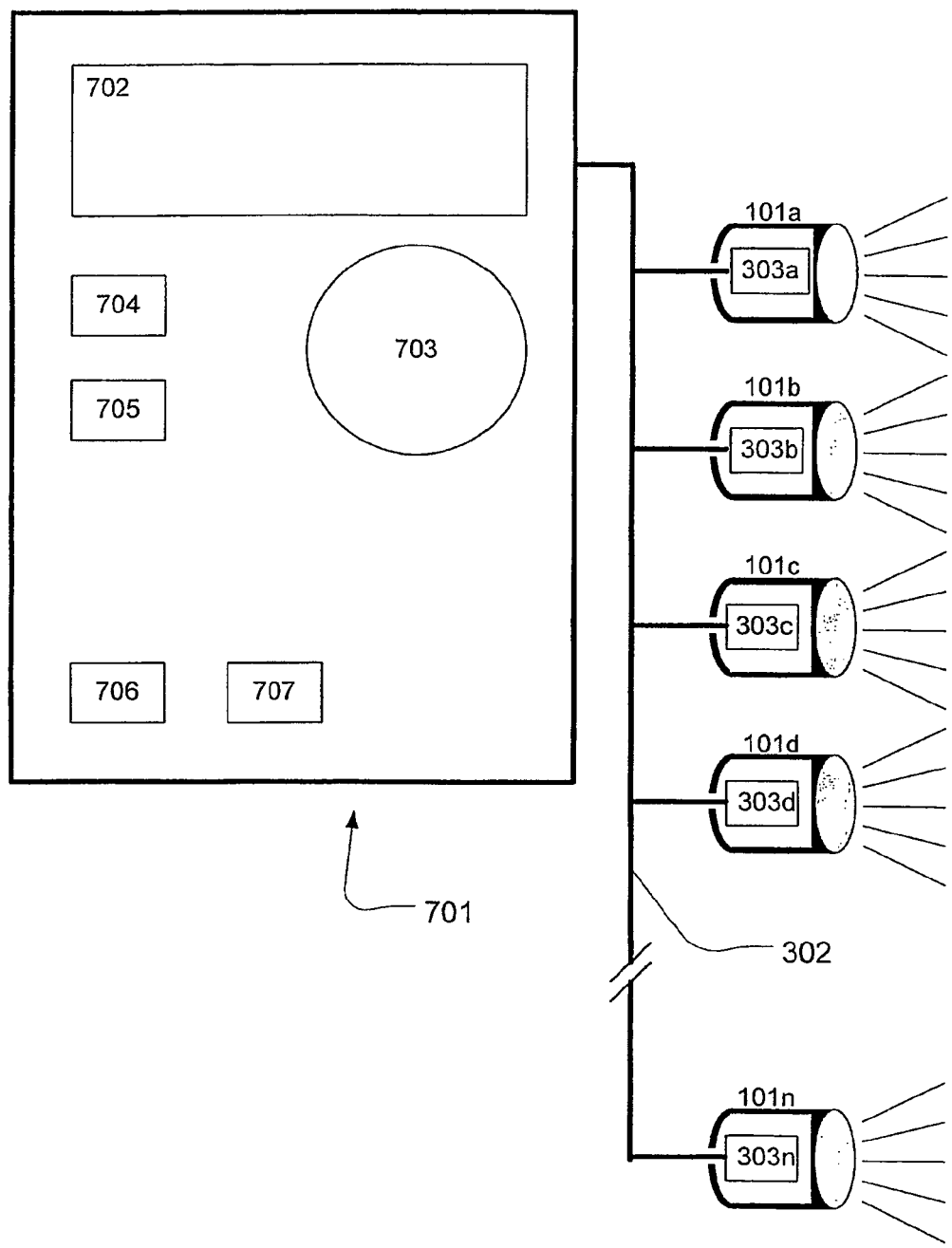
FIG. 7 illustrates a light adapter according to the present invention.

FIG. 7 illustrates a light adapter (701) according to the present invention. The light adapter comprises a display (702), a hue selector wheel (703), buttons for increasing (704) and decreasing (705) the color satuation, a storage button (706) and a recall (707) button. Lighting fixtures (101*a*, 101*b*, 101*c*, 101*d*, 101*n*) could be connected to the light adapter through a network (302) as described above, and the light adapter can be adapted to control the lighting fixtures as described above. The display would act as an interface providing a user with information such as the number, types of lighting fixtures connected to the light adapter, the target color, the fixture color emitted by each lighting fixture, etc. The hue selector wheel (703) could be used to choose the hue of the target color by rotating the wheel. A clockwise rotation would decrease the hue and the target color would therefore become more red, and a counter clockwise rotation would increase the hue resulting in a more blue target color. The saturation buttons (704, 705) could be used to increase (704) and decrease (705) the saturation of the target color. Hereby a user-friendly interface is provided and the user could choose any color visible to a person simply by rotating the hue selector wheel and adjusting the color saturation. The light adapter is connected to a number of lighting fixtures and the user needs not to worry about how the individual lighting fixture is controlled since this is performed by the light adapter as described above. The light adapter further comprises a memory button (706) which allows the user to store a target color such that the color could be recalled by using a recall button (707).

The above-described embodiments only serve as examples describing the present invention, and a person skilled in the art of lighting fixtures would be able to construct other embodiments within the scope of the present invention. The examples should therefore be seen as examples and not limit the present invention.

The invention claimed is:

1. A method of adjusting fixture colors emitted by at least a first and a second lighting fixture to a target color, where each lighting fixture comprises at least a first and a second light source emitting light having different source colors, and said fixture color is a result of a combination of said source colors, and said fixture color can be varied by varying an intensity of each light source, the method comprising:
   (a) receiving the target color by the first lighting fixture from a color controller via a network;
   (b) setting the first lighting fixture, by circuitry of the first lighting fixture, to the target color by using first color parameters stored in the circuitry of the first lighting fixture and based on a previously made color measurement of the first lighting fixture comprising color space information and color gamut values, the measurement occurring prior to receiving the target color by the first lighting fixture set forth in element (a), to vary the intensity of the light sources;
   (c) receiving the target color by the second lighting fixture from the color controller via the network; and
   (d) setting the second lighting fixture, by circuitry of the second lighting fixture, to the target color by using second color parameters stored in the circuitry of the second lighting fixture and based on a previously made color measurement of the second lighting fixture comprising color space information and color gamut values, the measurement occurring prior to receiving the target color by the second lighting fixture set forth in element (c), to vary the intensity of the light sources.

2. The method according to claim 1 characterized in that said method further comprises obtaining color parameters describing the colors of said source colors of said first and second lighting fixtures as a source position on a color map and generating first and second color gamuts using said source positions.

3. The method according to any one of claims 1-2 characterized in that said method further comprises the step of adjusting said target color as a position on a color map describing combined colors of said light sources of said first and second lighting fixtures.

4. The method according to claim 3, in which said color map is a CIE color map.

5. The method of claim 1 in which said first lighting fixture has a first color gamut and the second lighting fixture has a second color gamut, and further comprising adjusting the target color received by the first lighting fixture based on the first color gamut to ensure that said first lighting fixture will not be set to an unachievable color, and adjusting the target color by the second lighting fixture based on the second color gamut to ensure that the said second lighting fixture will not be set to an unachievable color.

6. The method according to any one of claims 1-2, in which said color controller has a global gamut of colors, and further comprising adjusting said target color such that the position of said target color is a part of said global gamut of colors.

7. The method according to any one of claims 1-2, in which said first and second color parameters include an intensity range of said light.

8. A light adapter for adjusting a fixture color emitted by at least a first and a second lighting fixture to a target color, said light adapter comprising: a color controller configured to communicate with the first lighting fixture and the second lighting fixture via a network, each lighting fixture comprising at least a first and a second light source emitting light having different first and second source colors, and said fixture color is obtained as a combination of said first and second source colors, the color controller having a global gamut for the first lighting fixture and the second lighting fixture, the color controller configured to receive the target color and adjust said target color such that the position of said target color is a part of said global gamut, and the color controller configured to transmit the adjusted target color to a first network driver of the first lighting fixture via the network, and a second network driver of the second lighting fixture via the network.

9. The light adapter according to claim 8 wherein the color controller is configured to obtain color parameters describing the color of said first and second source colors of said first and second lighting fixtures as a source position on a color map and to generate said global gamut using said color parameters.

10. The light adapter according to claim 9, characterized in that said color controller is configured to receive input indicative of said target color as a position on said color map.

11. The light adapter according to claim 9, wherein said color parameters further comprise an intensity range of said light sources.

12. The light adapter according to claim 9, characterized in that said color map is a CIE color map.

13. The light adapter according to claim 8, wherein the global gamut is based upon individual fixture gamuts of the first and second lighting fixtures.

14. The light adapter according to any one of claims 8 and 9, wherein the color controller is configured to generate the global gamut based on color parameters of at least the first and second lighting fixtures.

15. The light adapter according to any one of claims 8 and 9, wherein the color of said fixture color can be varied by varying an intensity of said source colors.

16. The light adapter according to claim 15, characterized in that said color controller is configured to obtain said color parameters through said network.

\* \* \* \* \*

UNITED STATES PATENT AND TRADEMARK OFFICE
CERTIFICATE OF CORRECTION

PATENT NO.        : 8,981,672 B2                                    Page 1 of 1
APPLICATION NO.   : 11/991950
DATED             : March 17, 2015
INVENTOR(S)       : Christian Krause It is certified that error appears in the above-identified patent and that said Letters Patent is hereby corrected as shown below:

In the Specification:
Column 9, line 46: Delete "Cr = Ig/yg" and replace with -- Cr = Ir/yr --

Signed and Sealed this
Twenty-eighth Day of July, 2015

Michelle K. Lee
*Director of the United States Patent and Trademark Office*